United States Patent
Byrne et al.

(10) Patent No.: US 9,249,797 B2
(45) Date of Patent: Feb. 2, 2016

(54) PLUNGER PACKING WITH WEDGE SEAL HAVING EXTRUSION RECESS

(75) Inventors: Joseph H. Byrne, Hudson Oaks, TX (US); Chang-Fei M. Yang, Arlington, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 990 days.

(21) Appl. No.: 13/328,608

(22) Filed: Dec. 16, 2011

(65) Prior Publication Data

US 2012/0152111 A1    Jun. 21, 2012

Related U.S. Application Data

(60) Provisional application No. 61/423,686, filed on Dec. 16, 2010.

(51) Int. Cl.
| | |
|---|---|
| *F16J 15/32* | (2006.01) |
| *F04B 53/14* | (2006.01) |
| *F16J 15/16* | (2006.01) |
| *F16J 15/18* | (2006.01) |
| *F16J 15/56* | (2006.01) |

(52) U.S. Cl.
CPC .............. *F04B 53/143* (2013.01); *F16J 15/166* (2013.01); *F16J 15/184* (2013.01); *F16J 15/3236* (2013.01); *F16J 15/56* (2013.01); *Y10T 29/49297* (2015.01)

(58) Field of Classification Search
CPC ....... F16J 15/3236; F16J 15/164; F16J 15/56; F16J 15/184
USPC .................. 277/307, 362, 392, 345, 358, 352
See application file for complete search history.

(56) References Cited

U.S. PATENT DOCUMENTS

| | | | |
|---|---|---|---|
| 3,037,460 A | | 6/1962 | Guest |
| 3,666,382 A | | 5/1972 | Rasmussen |
| 3,765,690 A | | 10/1973 | Sievenpiper |
| 3,786,551 A | | 1/1974 | Gregg et al. |
| 3,907,307 A | * | 9/1975 | Maurer et al. ................ 277/513 |

(Continued)

FOREIGN PATENT DOCUMENTS

| | | |
|---|---|---|
| CN | 201425021 Y | 3/2010 |
| CN | 201621057 U | 11/2010 |

(Continued)

OTHER PUBLICATIONS

U.S. Appl. No. 61/593,710, filed Feb. 1, 2012; First Inventor: Scott Skurdalsvold.

(Continued)

*Primary Examiner* — Nathaniel Wiehe
*Assistant Examiner* — Abiy Teka
(74) *Attorney, Agent, or Firm* — Gardere Wynne Sewell LLP (57) ABSTRACT

A seal assembly is disposed in an annular recess in a cylinder chamber between a pump cavity and a pump exterior. The seal assembly includes a main seal and a back-up seal and seals to a pump plunger disposed within the cylinder chamber. The back-up seal includes an extrusion recess extending from a surface of the back-up seal adjacent the main seal along an inner or an outer diameter of the back-up seal. During pumping operations the plunger strokes through the cylinder chamber causing the main seal to extrude into the extrusion recess to form a seal between the plunger and the cylinder chamber.

32 Claims, 3 Drawing Sheets

(56) References Cited

U.S. PATENT DOCUMENTS

| | | |
|---|---|---|
| 4,009,515 A | 3/1977 | Racin |
| 4,138,144 A | 2/1979 | Pierce, Jr. |
| 4,380,342 A | 4/1983 | Fling et al. |
| 4,589,180 A | 5/1986 | Vachon |
| 5,003,681 A | 4/1991 | Schley |
| 5,018,261 A | 5/1991 | Markous |
| 5,577,737 A | 11/1996 | Lacy |
| 6,195,863 B1 | 3/2001 | Blake |
| 6,415,487 B1 | 7/2002 | Leimer |
| 6,574,846 B1 | 6/2003 | Kang |
| 6,712,362 B2 | 3/2004 | Krappmann et al. |
| 6,755,099 B2 | 6/2004 | Huang |
| 6,758,478 B1 | 7/2004 | Moreno |
| 6,869,079 B2 | 3/2005 | Zheng |
| 7,194,948 B2 | 3/2007 | Liu |
| 7,389,579 B2 | 6/2008 | Rode |
| 7,748,095 B1 | 7/2010 | Phane |
| 8,402,880 B2 | 3/2013 | Patel et al. |
| 8,418,363 B2 | 4/2013 | Patel |
| 2003/0030228 A1 | 2/2003 | Graziani et al. |
| 2004/0046330 A1 | 3/2004 | Wobben |
| 2004/0170507 A1 | 9/2004 | Vicars |
| 2004/0255445 A1 | 12/2004 | Ploeger et al. |
| 2005/0201881 A1 | 9/2005 | Jensen et al. |
| 2008/0136118 A1* | 6/2008 | Ando et al. .......... 277/530 |
| 2009/0011225 A1 | 1/2009 | Moronuki et al. |
| 2010/0143163 A1 | 6/2010 | Patel et al. |
| 2010/0160710 A1 | 6/2010 | Strickland |
| 2010/0325888 A1 | 12/2010 | Hawes |
| 2013/0232789 A1 | 9/2013 | Patel |

FOREIGN PATENT DOCUMENTS

| | | |
|---|---|---|
| CN | 201730815 U | 2/2011 |
| CN | 103370543 A | 10/2013 |
| JP | 7113426 B | 12/1995 |
| JP | 2002161982 A | 6/2002 |
| JP | 2003065439 A | 3/2003 |
| JP | 2008539364 A | 11/2008 |
| KR | 1019990079544 | 11/1999 |
| KR | 100383826 B1 | 5/2003 |
| KR | 100402825 B1 | 10/2003 |
| KR | 798807 B1 | 1/2008 |
| WO | WO-9950578 A1 | 10/1999 |
| WO | WO-2008137515 A1 | 11/2008 |
| WO | WO-2011002902 A2 | 1/2011 |
| WO | WO-2011008763 A2 | 1/2011 |
| WO | WO-2012083179 A2 | 6/2012 |

OTHER PUBLICATIONS

International Search Report and Written Opinion (PCT/US2011/065514), dated Aug. 24, 2012.

International Search Report and Written Opinion for Application No. PCT/US2010/040628 mailed on Jan. 27, 2011, 7 pages.

International Search Report and Written Opinion for Application No. PCT/US2010/041832 mailed on Feb. 1, 2011, 8 pages.

Notice of Allowance mailed Dec. 17, 2012, by the USPTO, re U.S. Appl. No. 12/835,496.

Office Action mailed Feb. 12, 2013, by the USPTO re U.S. Appl. No. 12/826,493.

Office Action mailed Sep. 13, 2013, by the USPTO, re U.S. Appl. No. 13/863,070.

Restriction Requirement mailed Nov. 5, 2012, by the USPTO, re U.S. Appl. No. 12/826,493.

Restriction Requirement mailed Oct. 23, 2012, by the USPTO, re U.S. Appl. No. 12/835,496.

* cited by examiner

PLUNGER PACKING WITH WEDGE SEAL HAVING EXTRUSION RECESS

CROSS REFERENCE TO RELATED APPLICATIONS

This application claims the benefit of and priority to U.S. Provisional Patent Application No. 61/423,686, filed on Dec. 16, 2010, and herein incorporated by reference in its entirety.

TECHNICAL FIELD

The disclosed embodiments relate in general to reciprocating pumps and, in particular, to a packing assembly seal between a pump housing and a pump plunger.

BACKGROUND OF THE DISCLOSURE

In oil field operations, reciprocating pumps are often used for various purposes. Reciprocating pumps utilize a plunger that reciprocates in and out of a pump housing to move fluid through a cavity defined by the pump housing. A motor rotates a crankshaft connected to the plunger to pull fluid into the pump cavity through a fluid intake and push fluid out of the pump cavity through a pump outlet. The plunger extends through a cylinder chamber of the pump housing to interact with the cavity. A seal in the cylinder chamber of the pump housing prevents leakage of fluid from around the plunger during pumping operations. Generally, a seal or packing assembly is composed of different types of seals to increase the sealing impact of the seal assembly. The seal assembly is disposed within a recess of the cylinder chamber.

In one type of seal assembly, a main seal or pressure ring is sandwiched between at least two other seal types. Generally the main seal will be formed of a pliable or rubber-like material. During operation, the seal assembly is compressed, causing the main seal to flair into contact with the pump housing at the cylinder chamber and the plunger. The rubber material of the main seal flows like a thick liquid during operation, which results in the pressure in the main seal to drop due to flow loss and wall friction loss. The lower pressure allows the higher pressure of the pumped fluid to flow around both sides of the main seal, causing it to hydraulically float and preventing seal formation. Instead, the seal assembly seals at narrow gaps formed between a ring adjacent the main seal and both the housing and the plunger. The pliant material of the main seal will flow into this gap, increasing the contact pressure between the elastomer and the walls of the recess. The contact pressure is higher than the pumping pressure, which causes the main seal to form a seal in the narrow gaps. The narrow gaps run the length of the adjacent ring. The narrow width of the gaps and the length of the extrusion into the gaps may exceed the pliant properties of the main seal, causing extreme fatigue and failure of the main seal, and ultimately failure of the pump. Thus, a seal assembly is needed that provides a seal between the plunger and the pump housing at the cylinder chamber while relieving stress and fatigue on the main seal to extend the life of the main seal and ultimately of the packing assembly.

SUMMARY

In a first aspect, embodiments are disclosed of a seal assembly disposed within an annular recess of a cylindrical chamber for receiving a plunger. The seal assembly includes a main seal having an axis, a forward side, and a rearward side, and a back-up seal in abutment with the rearward side of the main seal, the back-up seal having inner and outer diameter cylindrical surfaces. The back-up seal made of a material harder than a material of the main seal and is expansible in radial width between the inner and outer diameter cylindrical surfaces in response to an axially directed rearward force. The at least one extrusion recess on a forward side of the back-up seal receives an extruded portion of the rearward side of the main seal during a forward stroke of the pump plunger.

In certain embodiments, the back-up seal includes a rearward wedge ring and a forward wedge ring each of the wedge rings having a cylindrical surface. The rearward wedge ring and the forward wedge ring each have a mating angled surfaces configured to slide against one another to increase their combined radial width relative to an axis of the cylinder chamber during operation of the pump.

In certain embodiments, the rearward wedge ring has an angled surface in the range of from about 20 degrees to about 85 degrees relative to an axis perpendicular to the longitudinal axis of the annular recess.

In certain embodiments, the forward wedge ring has an angled surface in the range of from about 20 degrees to about 85 degrees relative to an axis perpendicular to the longitudinal axis of the annular recess.

In other embodiments, the rearward wedge ring has an angled surface in the range of from about 20 degrees to about 85 degrees relative to an axis perpendicular to the longitudinal axis of the plunger.

In certain embodiments, the forward wedge ring has an angled surface in the range of from about 20 degrees to about 85 degrees relative to an axis perpendicular to the longitudinal axis of the plunger.

In certain embodiments, the at least one extrusion recess is at an intersection of the rearward and forward wedge rings.

In certain embodiments, the extrusion recess extends a selected distance rearward from the forward edge of the cylindrical surface of at least one of the wedge rings, defining a forward facing step at a rearward end of the extrusion recess.

In certain embodiment, the extrusion recess has an entrance substantially at an intersection of the angled surface with the cylindrical surface of at least one of the wedge rings.

In certain embodiments, the forward wedge ring has a forward facing convex surface adjacent to and in contact with a rearward facing concave surface of the main seal, and the extrusion recess is positioned at a rearward end of the convex surface portion.

In certain embodiments, the at least one extrusion recess comprises two extrusion recesses, each located at a forward edge of one of the cylindrical surfaces.

In certain embodiments, the extrusion recess has an entrance substantially at an intersection of the inclined surface with the cylindrical surface of at least one of the wedge rings.

In a second aspect, embodiments are disclosed of a reciprocating pump assembly. The pump assembly includes a pump housing defining a pump cavity in an interior of the housing and a cylinder chamber extending from an exterior of the pump housing to the pump cavity. A plunger is disposed at least partially within the cylinder chamber and configured to reciprocate into and out of the pump cavity in rearward and forward directions between suction and discharge strokes, respectively. An annular recess is formed in the cylinder chamber and positioned between an exterior of the pump housing and the pump cavity. A seal assembly having a main seal in abutment with a wedge-type seal is disposed within the recess; the seal assembly is configured to seal the plunger to the cylinder chamber. The wedge-type seal comprises a rearward wedge ring and a forward wedge ring each of the wedge rings having a cylindrical surface. The rearward wedge ring and the forward wedge ring have mating angled surfaces configured to slide against one another to increase their combined radial width relative to an axis of the cylinder chamber during a discharge stroke. At least one extrusion recess is formed on a forward edge of the cylindrical surface on at least one of the wedge rings. During the discharge stroke of the plunger a rearward portion of the main seal extrudes into the extrusion recess.

In certain embodiments, the at least one extrusion recess is on a forward edge of the cylindrical surface.

In certain embodiments, the rearward wedge ring has an angled surface in the range of from about 20 degrees to about 85 degrees relative to an axis perpendicular to the longitudinal axis of the annular recess.

In certain embodiments, the forward wedge ring has an angled surface in the range of from about 20 degrees to about 85 degrees relative to an axis perpendicular to the longitudinal axis of the annular recess.

In certain embodiments, the rearward wedge ring has an angled surface in the range of from about 20 degrees to about 85 degrees relative to an axis perpendicular to the longitudinal axis of the plunger.

In certain embodiments, the forward wedge ring has an angled surface in the range of from about 20 degrees to about 85 degrees relative to an axis perpendicular to the longitudinal axis of the plunger.

In other embodiments, the at least one extrusion recess is at an intersection of the rearward and forward wedge rings.

In certain embodiments, the extrusion recess extends a selected distance rearward from the forward edge of the cylindrical surface of at least one of the wedge rings, defining a forward facing step at a rearward end of the extrusion recess.

In certain embodiments, during the discharge stroke, one of the cylindrical surfaces is in contact with the plunger and the other is in contact with the annular recess in the cylindrical chamber.

In certain embodiments, the extrusion recess has an entrance substantially at an intersection of the angled surface with the cylindrical surface of at least one of the wedge rings.

In certain embodiments, an inner one of the cylindrical surfaces is in sliding engagement with the plunger, and the extrusion recess is located on the cylindrical surface of the inner one of the cylindrical surfaces.

In certain embodiments, the at least one extrusion recess comprises two extrusion recesses, each located at a forward edge of one of the cylindrical surfaces.

In certain embodiments, the forward wedge ring has a forward facing convex surface adjacent to and in contact with a rearward facing concave surface of the main seal, and the extrusion recess is positioned at a rearward end of the convex surface portion.

In certain embodiments, the extrusion recess has an entrance substantially at an intersection of the angled surface with the cylindrical surface of at least one of the wedge rings.

In certain embodiments, the main seal is formed of a material that is softer than the material of the wedge ring.

In a third aspect, embodiments are disclosed of a method for sealing a plunger to a pump housing within a reciprocating pump assembly. The method provides a seal assembly having a main seal and a back-up seal, the back-up seal being of a material harder than a material of the main seal and being expansible in radial width between inner and outer diameter cylindrical surfaces in response to an axially directed rearward force, and at least one extrusion recess for receiving an extruded portion of the rearward side of the main seal during a forward stroke of the pump plunger. The method positions the seal assembly within a recess of a cylinder chamber that extends between an exterior of the pump housing and a pump cavity. The method inserts a plunger into the cylinder chamber so that an exterior diameter of the plunger contacts the seal assembly. The method reciprocates the plunger into and out of the pump cavity through the cylinder chamber. As the plunger moves forward relative to the seal assembly, the method expands a radial width of the back-up seal and extrudes a portion of the main seal into the extrusion recess of the back-up seal.

In certain embodiments, the method further comprises the extrusion recess is on a forward side of the back-up seal at an intersection of the forward side with one of the cylindrical surfaces and extending the extrusion recess a selected distance rearward from the forward edge of the cylindrical surface of at least one of the wedge rings to define a forward facing step at a rearward end of the extrusion recess.

In certain embodiments, the method comprises contacting the plunger with one of the cylindrical surfaces of the back-up seal and contacting the annular recess in the cylindrical chamber with the other cylindrical surface of the back-up seal.

In certain embodiments, an inner one of the cylindrical surfaces is in sliding engagement with the plunger, and the method further comprises locating the extrusion recess on the cylindrical surface of the inner one of the cylindrical surfaces.

In certain embodiments, the at least one extrusion recess comprises two extrusion recesses and the method comprises locating each extrusion recess at a forward edge of one of the cylindrical surfaces.

In certain embodiments, the at least one extrusion recess is at an intersection of the rearward and forward wedge rings.

Other aspects, features, and advantages will become apparent from the following detailed description when taken in conjunction with the accompanying drawings, which are a part of this disclosure and which illustrate, by way of example, principles of any embodiments disclosed.

DESCRIPTION OF THE FIGURES

The accompanying drawings facilitate an understanding of the various embodiments.

DETAILED DESCRIPTION

Figure 1:
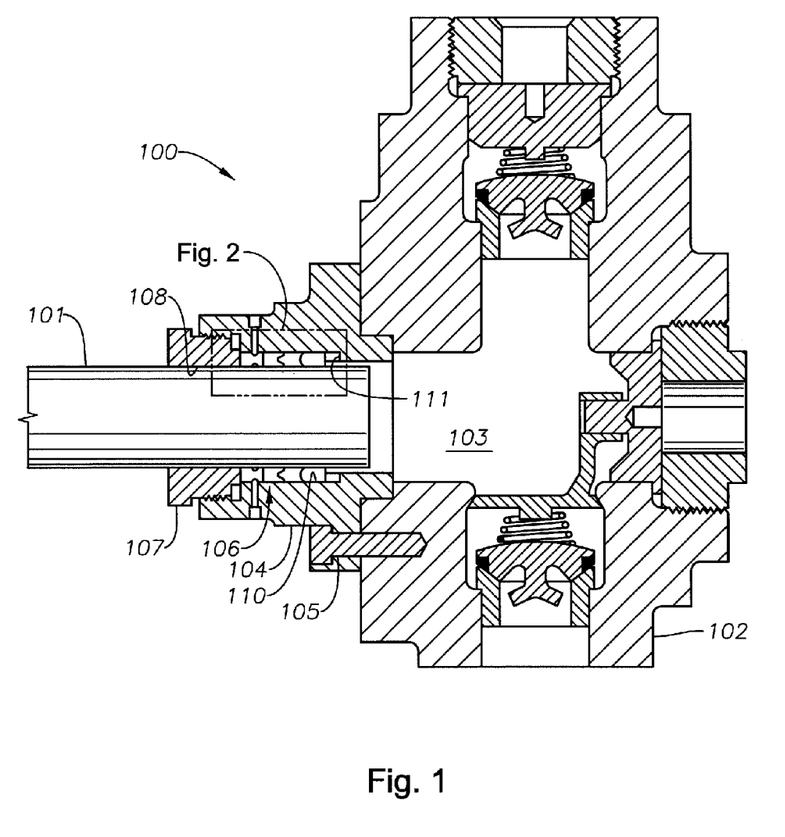
FIG. 1 is a sectional view of a portion of a reciprocating pump showing a plunger and fluid end.

Referring to FIG. 1, there is shown a sectional view of a portion of a reciprocating pump 100 used in oilfield fracturing operations. The reciprocating pump 100 comprises a plunger 101 and a housing or fluid end 102. The plunger 101 couples to a crankshaft (not shown) in the power end of the reciprocating pump. In the illustrated embodiment, the crankshaft strokes the plunger 101 horizontally into and out of the housing 102 alternately drawing fluid into a cavity 103 defined by the housing 102 and forcing fluid out of the cavity 103. The horizontal strokes of the plunger 101 may be characterized as a rearward or intake stroke when the plunger 101 moves away from or out of the cavity 103 and a forward or discharge stroke when the plunger 101 moves toward or into the cavity 103. As used herein, rearward will generally refer to movement away from the cavity 103. Similarly, forward will generally refer to movement toward the cavity 103 or the surfaces facing the cavity 103. In an operational use of the pump 100, the fluid is forced into a geologic formation to fracture the formation to enhance hydrocarbon production. In another operational use of the pump 100, the fluid may be circulated through a drill string during drilling operations. A person skilled in the art will understand that the embodiments disclosed herein may be applied to any type of reciprocating pump.

A packing gland or housing flange 104 couples and aligns the plunger 101 to the housing 102 with at least one bolt 105. A person skilled in the art will understand that the housing flange 104 may couple to the housing 102 by more than one bolt 105 or through alternate means. In the illustrated embodiment, the housing flange 104 defines a cylinder 108 of a size and shape such that the plunger 101 may alternately stroke into and stroke out of the cylinder 108 into the cavity 103 with minimal clearance between an interior wall defining the cylinder 108 and the plunger 101. The housing flange 104 further defines an annular recess 110 extending inward from the interior wall of the housing flange 104 defining the cylinder 108. An outward facing shoulder 111 comprises an annular vertical portion of the recess 110 opposite a threaded retainer nut 107 described in more detail below. An exterior surface of the plunger 101 is proximate to the recess 110. The packing assembly 106 substantially fills the recess 110 between the housing flange 104 and the plunger 101. The threaded retainer nut 107 couples to the housing flange 104 with coacting threads defined by the housing flange 104. In this manner, the threaded retainer nut 107 applies a force against the packing assembly 106 pressing the packing assembly 106 against the shoulder 111 and causing the packing assembly 106 to seal the cylinder 108 between the plunger 101 and the housing flange 104.

Figure 2:
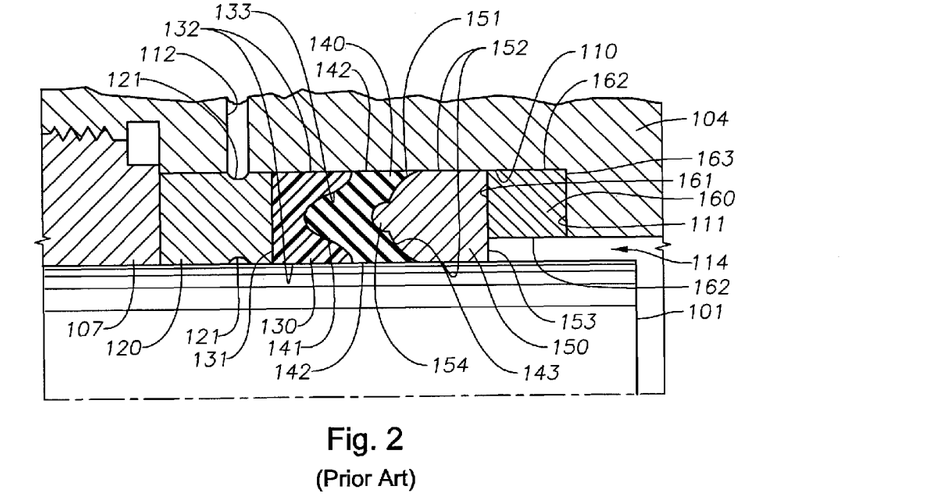
FIG. 2 is a detail view of a prior art packing assembly in the fluid end of FIG. 1, taken as indicated in FIG. 1.

Referring now to the prior art illustration of FIG. 2, there is shown a portion of the reciprocating pump 100 of FIG. 1 illustrating additional details of the packing assembly 106. As illustrated in FIG. 2, the packing assembly 106 comprises a brass lantern ring 120, a back-up seal or hard plastic ring 130, a main seal 140, a header seal 150, and a junk ring 160. In the illustrated embodiment, the brass lantern ring 120 comprises a ring having a substantially rectangular cross section. The brass lantern ring 120 substantially fills a portion of the recess 110 abutting the threaded retainer nut 107. The brass lantern ring 120 defines an annular groove 121 proximate to a lubricant passage 112 defined by the housing flange 104. The groove 121 and the lubricant passage 112 are configured, to pass a lubricant through the housing flange 104 for distribution in the cylinder 108 between the housing flange 104 and the plunger 101.

The hard plastic ring 130 abuts an end of the brass lantern ring 120 opposite the threaded retainer nut 107, substantially filling a portion of recess 110. A cross section of the hard plastic ring 130 is defined by a rearward or an annular flat vertical surface 131, inner and outer diameter cylindrical surfaces 132, and a forward or an annular concave surface 133 opposite the flat vertical surface 131. In the illustrated embodiment, the flat vertical surface 131 abuts the vertical end of the brass lantern ring 120 opposite the threaded retainer nut 107. Preferably, the hard plastic ring 130 comprises a material such as a polyether ether ketone (PEEK), although other materials may be used.

In the illustrated embodiment, the main seal 140 abuts the concave surface 133 of the hard plastic seal 130 opposite the brass lantern ring 120, substantially filling a portion of the recess 110. A cross section of the main seal 140 is defined by a rearward annular convex surface 141 abutting and conforming to the annular concave surface 133 of the hard plastic ring 130. The cross section is further defined by inner and outer diameter cylindrical surfaces 142, and a forward annular concave surface 143 opposite the convex surface 141. The main seal 140 comprises a soft rubber material such as hydrogenated nitrile butadiene rubber (HNBR) or the like, although other materials may be used.

The header seal 150 abuts the concave surface 143 of the main seal 140 opposite the hard plastic seal 130, substantially filling a portion of the recess 110. A cross section of the header seal 150 is defined by an annular convex surface 151 abutting and conforming to the annular concave surface 143 of the main seal 140. The cross section is further defined by inner and outer diameter surfaces 152, and an annular vertical surface 153 opposite annular convex surface 151. The vertical surface 153 defines an annular protrusion 154 opposite the annular convex surface 151 extending toward the junk ring 160. In a natural state, the inner diameter surface 152 bulges radially inward. The plunger 101 deforms the inner diameter surface 152, causing it to exert an axial energizing force on the main seal 140. Preferably, the header seal 150 comprises a material softer than the main seal 140.

The junk ring 160 comprises a ring abutting the vertical surface 153 of the header seal 150 and the shoulder 111 defined by the housing flange 104. The junk ring 160 substantially fills a remaining portion of the recess 110, thereby securing the packing assembly 106 within the housing flange 104. A cross section of the junk ring 160 is defined by an annular surface 161 abutting the vertical surface 153 of the header seal 150. When the packing assembly 106 is energized, described in more detail below, the surface 161 deforms the protrusion 154 of the header seal 150. The cross section of the junk ring 160 is further defined by inner and outer diameter surfaces 162, and an annular vertical surface 163 opposite the surface 161. The inner diameter 162 of the junk ring 160 is greater than the outer diameter of the plunger 101, thereby defining an annular gap 114.

In operation, the threaded retainer ring 107 is tightened, exerting an axial force against the brass lantern ring 120. The force exerted by the threaded retainer ring 107 causes a reacting force in the shoulder 111. These opposing forces transfer through the packing assembly 106 and cause the header seal 150 and the protrusion 154 to deform. The deformation of the header seal 150 and the protrusion 154 exerts a setting force on the main seal 140 pressing the inner and outer diameter surfaces 142 into contact with the interior wall of the housing flange 104 and the surface of the plunger 101. The HNBR material of the main seal 140 flows like a thick liquid causing the internal pressure of the main seal 140 to drop due to flow loss and friction loss along the length of the main seal 140 moving away from the header seal 150 towards the hard plastic ring 130. This lower internal pressure of the main seal 140 allows the higher pressure of the pumped fluid to flow between the inner and outer diameter surfaces 142, the plunger 101, and the housing flange 104, hydraulically floating the main seal 140 during operation.

Sealing of the cylinder 108 occurs in a narrow area between the hard plastic ring 130 and the housing flange 104, and the hard plastic ring 130 and the plunger 101. During a pumping stroke of the plunger 101, the material of the main seal 140 flows into the very narrow areas between the inner and outer diameter surfaces 132 of the hard plastic ring 130, the plunger 101, and the housing flange 104. As the main seal 140 flows or extrudes into the narrow areas between the hard plastic ring 130, the housing flange 104, and the plunger 101, the narrowness of the space increases the contact pressure between the main seal 140, the housing flange 104, and the plunger 101 to a pressure higher than the pumping pressure. In this manner, the packing assembly 106 seals the space between the plunger 101 and the housing flange 104. During the suction stroke of the plunger 101 the pumping pressure drops and the main seal 140 flows out of the narrow gap between the hard plastic ring 130, the housing flange 104, and the plunger 101.

Extrusion of or flow of the main seal 140 occurs along the length of the narrow gap between the hard plastic ring 130, the housing flange 104, and the plunger 101 exceeding the elongation properties of the main seal 140 and fatiguing the main seal 140. At the corner where the main seal 140 meets the hard plastic ring 130 adjacent to the plunger 101, i.e., the heel of the main seal 140, the main seal 140 experiences extreme sheer loads during operation due to the motion of the plunger 101. Consequently, the heel of the main seal 140 fatigues and fails first. Repeated extrusion and return of the main seal 140 into the narrow gap between the hard plastic ring 130, the housing flange 104, and the plunger 101 cause the extruded portions to begin to tear and flake off. Eventually, enough of the main seal 140 volume is lost and can no longer extrude into the narrow space between the hard plastic ring 130, the housing flange 104, and the plunger 101. When this occurs, the high pressure of the pumped fluid causes catastrophic failure of the packing assembly 106.

Figure 3:
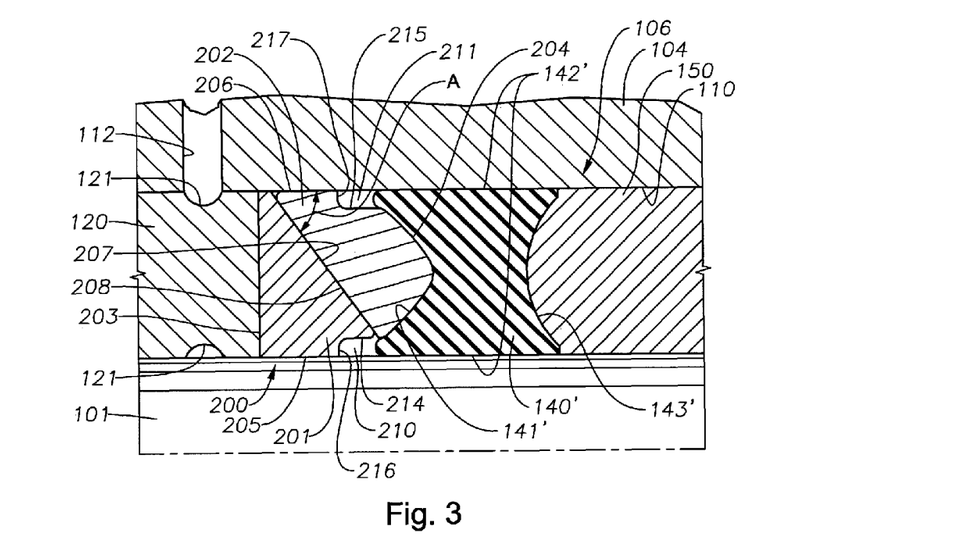
FIG. 3 is a detail view of an embodiment of the packing assembly.

Referring now to FIG. 3, an embodiment of the packing assembly 106 comprises a wedge-type back-up seal or hard plastic ring 200. The wedge-type back-up seal 200 includes a rearward wedge ring 201 and a forward wedge ring 202. In the illustrated embodiment, the rearward wedge ring 201 comprises an approximately triangular cross sectional area defined by a rearward annular vertical surface 203 abutting an end of the brass lantern ring 120 opposite the threaded retainer nut 107 (not shown in FIG. 3), a cylindrical inner diameter surface 205 adjacent to the plunger 101, and a forward angled surface 207 extending between an upper end of the vertical surface 203 and an end of the inner diameter surface 205 opposite the brass lantern ring 120.

The cylindrical inner diameter surface 205 comprises a flat surface adjacent to the plunger 101, a cylindrical wall surface 216, and a flat end wall 214. The cylindrical wall surface 216 can be transverse or perpendicular to the recess 110 and connects with the flat end wall 214 to form a rounded 90 degree corner. The flat end wall 214 can be transverse or parallel to the recess 110. In other embodiments, the cylindrical wall surface 216 and flat end wall surface 214 connect to form a corner having an angle in the range of from greater than 30 degrees to less than 150 degrees, from about 30 degrees to about 120 degrees, or from about 60 degrees to about 100 degrees.

The rearward wedge ring 201 defines a portion of an annular inner extrusion recess 210 proximate to a main seal 140' and extending vertically inward from the inner diameter surface 205 toward the housing flange 104. The inner extrusion recess 210 is at the intersection of the inner diameter 205 and the angled surface 207. The inner extrusion recess 210 extends a selected distance from the vertical surface 203, terminating at the flat end wall 214. The inner extrusion recess 210 is defined by the cylindrical wall 216 that is a short distance from the angled surface 207. The annular inner extrusion recess 210 is further defined by a corner of the forward wedge ring 202 and an annular convex surface 141' of the main seal 140'. When the plunger 101 is in the forward position, the plunger 101 defines the bottom surface of the annular inner extrusion recess 210. When the plunger 101 is in the rearward position, the annular inner extrusion recess 210 has no bottom surface and can be open to cylinder 108.

The forward wedge ring 202 comprises a cross sectional area defined by a forward annular convex surface 204 abutting an adjacent end of the main seal 140' opposite the header seal 150, a cylindrical outer diameter surface 206 adjacent the housing flange 104, and a rearward angled surface 208 extending between a lower end of convex surface 204 and an end of outer diameter surface 206 proximate to the brass lantern ring 120. The angled surface 208 of the forward wedge ring 202 abuts and corresponds to the angled surface 207 of the rearward wedge ring 201.

The angled surfaces 207, 208 of the rearward and forward wedge rings 201, 202 are determined so that the inner and outer surfaces 205, 206 of the wedge rings exerts pressure against the plunger 101 and housing flange 104 in an amount that is slightly higher than the contact pressure between the main seal 140' and plunger 101 and the main seal 140' and the housing flange 104.

An embodiment provides that the angled surfaces 207, 208 can be complementary angles to each other, for example, the angle of 207 and the angle of 208 together equal about 90 degrees. The angled of the surfaces 207, 208 of the rearward and forward wedge rings 201, 202 can be from about 20 degrees to about 85 degrees relative to an axis perpendicular to the longitudinal axis of the recess 110 and having a corner at the recess 110 or an axis perpendicular to the longitudinal axis of the plunger 101 and having a corner at the plunger 101. In alternate embodiments, the angle of the surfaces 207, 208 of the rearward and forward wedge rings 201, 202 can be from about 25 degrees to about 70 degrees relative to an axis perpendicular to the longitudinal axis of the recess 110 and having a corner at the recess 110 or an axis perpendicular to the longitudinal axis of the plunger 101 and having a corner at the plunger 101.

Referring to FIG. 3, the angled surface 207 of the rearward wedge ring 201 is oriented at about 45 degrees relative to the vertical surface 203 or an axis perpendicular to the longitudinal axis of the recess 110 having a corner at recess 110. The angled surface 208 of the forward wedge ring 202 is at an angle complementary to the angle surface 207. For example and not limitation, the angled surface 208 of the forward wedge ring has an angle A of 45 degrees relative to an axis perpendicular to the longitudinal axis of the recess 110 having a corner at recess 110.

The forward wedge ring 202 defines a portion of an annular outer extrusion recess 211 proximate to the main seal 140' and extending vertically inward from the outer diameter surface 206 toward the plunger 101. The outer extrusion recess 211 is at the intersection of the outer diameter surface 206 and the convex surface 204. The outer extrusion recess 211 extends a selected distance from the convex surface 204, terminating in a flat end wall 215 of the forward wedge ring 202. The flat end wall 215 is transverse or parallel to the cylinder 110. The outer extrusion recess 211 is further defined by a cylindrical wall 217 that is a short distance from the convex surface 204. The cylindrical wall 217 is transverse or perpendicular to the cylinder 110. Preferably, the corner where the flat end wall 215 intersects with the cylindrical wall 217 is rounded and at an angle of about 90 degrees. However, in other embodiments the flat end wall 215 and the cylindrical wall 217 connect to form a corner having an angle in the range of from greater than 30 degrees to less than 150 degrees, from about 30 degrees to about 120 degrees, or from about 60 degrees to about 100 degrees. The cylinder 110 defines the upper surface of the outer extrusion recess 211. An annular concave surface 141' of the main seal 140' defines the forward surface of the outer extrusion recess 211. A person skilled in the art will understand that embodiments may include only the inner extrusion recess 210 or the outer extrusion recess 211 as well as both the inner and the outer extrusion recesses 210, 211 as illustrated herein.

In the embodiment illustrated in FIG. 3, a cross section of the main seal 140' is defined by the annular concave surface 141' abutting the convex surface 204 of the forward wedge ring 202. The cross section also comprises inner and outer diameter surfaces 142', and an annular concave surface 143' opposite the vertical surface 141'. The remainder of seal assembly 106 includes the portions of seal assembly 106 illustrated and described with respect to FIG. 2 including the header seal 150 and junk ring 160.

Figure 4:
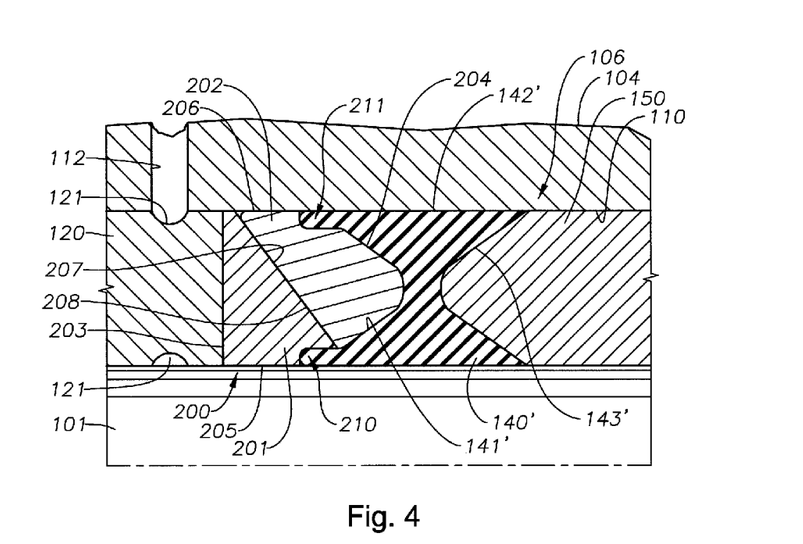
FIG. 4 is a detail view of the packing assembly of FIG. 3 during operation.

In operation, as illustrated at FIG. 4, the threaded retainer ring 107 (not shown) is tightened exerting an axial force against the brass lantern ring 120. The force exerted by the threaded retainer ring 107 (not shown) causes a reacting force in the shoulder 111 (not shown). These opposing forces transfer through the packing assembly 106 and cause the soft header seal 150 to deform as shown in FIG. 4. The deformation of the header seal 150 exerts a setting force on the main seal 140' pressing the opposing inner and outer diameter surfaces 142' into contact with the interior wall of the housing flange 104 and the exterior surface of the plunger 101. When the plunger 101 strokes horizontally in FIG. 4, high pressure on the main seal 140' forces the rearward wedge seal 201 into tight contact with the plunger 101. Similarly, the high pressure forces on the main seal 140' cause the angled surface 208 of the forward wedge seal 202 to slide upward along the angled surface 207 of the rearward wedge seal 201 coming into tight contact with the housing flange 104. Thus, unlike the hard plastic ring 130 of FIG. 2, the narrow gaps between the wedge-type hard plastic ring 200, the plunger 101, and the housing flange 104 are closed.

In the preferred embodiment, a portion of the main seal 140' then extrudes into the inner extrusion recess 210 and the outer extrusion recess 211. The geometry of the inner extrusion recess 210 and the outer extrusion recess 211 is selected such that portions of the main seal 140' will flow or extrude into the extrusion recesses 210, 211 to create a contact pressure between the main seal 140', the plunger 101, and the housing flange 104 that is higher than the pump fluid pressure without the extrusion exceeding the elongation properties of the main seal 140'. A person skilled in the art will understand that alternative embodiments may include only one extrusion recess.

The suction stroke of the plunger 101 relieves the high pressure in the cavity 103 (not shown) and the extruded portions of the main seal 140' return to their original shape. Thus, the extrusion recesses 210, 211 provide areas for controlled extrusion of the main seal 140' that limit the thinness of the extrusion during operation. Allowing a preset volume of extrusion into the extrusion recesses 210, 211 decreases the intensity of the stresses on the extruded portions of the main seal 140' over the main seal 140 as described with respect to FIG. 2. Furthermore, the rounded corners defining the extrusion recesses 210, 211 eliminate additional localized stresses in the main seal 140' caused by the corners of the hard plastic seal 130 on the main seal 140 of FIG. 2. The reduction in stress on the main seal 140' extends the life of the main seal 140' of FIG. 3 and FIG. 4 while still allowing for a tight seal of the cylinder 108 between the housing flange 104 and the plunger 101.

Figure 5:
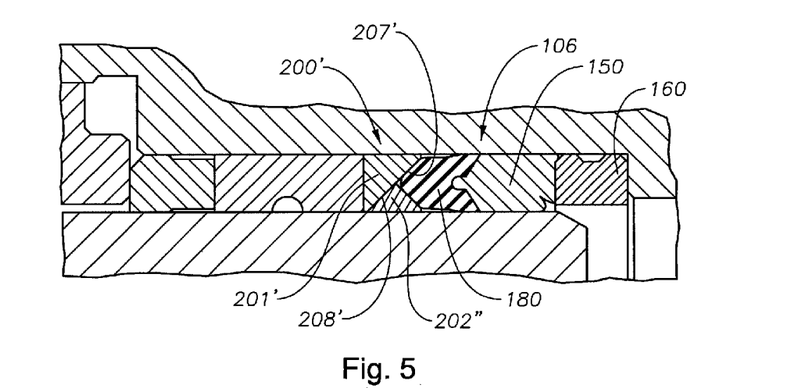
FIG. 5 is a detail view of another embodiment of the packing assembly.

FIG. 5 illustrates an embodiment of a packing assembly 106 comprising a wedge-type back up seal or hard plastic ring 200'. The wedge-type back-up seal 200' includes a rearward wedge ring 201' and a forward wedge ring 202'. In the illustrated but non-limiting embodiment, the rearward wedge ring 201' comprises an approximately triangular cross sectional area similar to the embodiment shown in FIG. 3. However, unlike FIG. 3, the angled surface 207' of the rearward wedge 201' is at an angle originating from an axis perpendicular to the longitudinal axis of the plunger 101 and having a corner at the plunger 101.

The forward wedge ring 202' comprises a triangular cross sectional area and includes an angled surface 208' having an angle originating from an axis perpendicular to the longitudinal axis of the plunger 101 and having a corner at the plunger 101. The forward wedge ring 202' includes an extrusion recess at the top of the triangle for controlled expansion of the main seal 180. The extrusion recess is provided at the intersection and on the forward sides of the rearward and forward wedge rings 201', 202'.

The angled of the surfaces 207', 208' of the rearward and forward wedge rings 201', 202' can be from about 20 degrees to about 85 degrees relative an axis perpendicular to the longitudinal axis of the plunger 101 and having a corner at the plunger 101 or 25 degrees to about 70 degrees relative to an axis perpendicular to the longitudinal axis of the plunger 101 and having a corner at the plunger 101.

The angled surfaces 207', 208' and the extrusion recess formed on the forward sides of the rearward and forward wedge rings 201', 202' are selected such that portions of the main seal flow or extrudes in the extrusion recess to create contact pressure between the main seal 180, the plunger 101, and the housing flange 104 that is the higher than the pump fluid pressure without the extrusion exceeding the elongation properties of the main seal 180. The reduction in stress on the main seal 180 extends the life of the main seal 180 of FIG. 5 and while providing a tight seal of the cylinder 108 between the housing flange 104 and the plunger 101.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "forward" and "rearward", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments alterations, modifications, additions and/or changes can be made thereto without departing from the scope and spirit of the disclosed embodiments, the embodiments being illustrative and not restrictive.

Furthermore, embodiments have described in connection with what are presently considered to be the most practical and preferred embodiments, it is to be understood that the embodiments are not to be limited to the disclosed embodiments, but on the contrary, is intended to cover various modifications and equivalent arrangements included within the spirit and scope of the embodiment(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A seal assembly for use within an annular recess of a cylindrical chamber for receiving a plunger in a pump, the seal assembly comprising:
   a main seal having an axis, a forward side, and a rearward side;
   a back-up seal configured to be in abutment with the rearward side of the main seal, the back-up seal having inner and outer diameter cylindrical surfaces;
   the back-up seal being of a material harder than a material of the main seal and being expansible in a radial direction that is perpendicular to the axis of the main seal in response to an axially directed force;
   at least one extrusion recess on a forward side of the back-up seal for receiving an extruded portion of the rearward side of the main seal during a forward stroke of a pump plunger; and
   wherein the backup seal comprises a rearward wedge ring and a forward wedge ring each of the wedge rings having a cylindrical surface, wherein the rearward wedge ring and the forward wedge ring each have a mating angled surface configured to slide against one another such that the rearward and forward wedge rings can slidingly move in the radial direction to adjust a combined radial width relative to a cylinder chamber during operation of a pump and to receive the extruded portion of the main seal at least partially within the extrusion recess during a forward stroke of a pump plunger.

2. The seal assembly of claim 1, wherein the rearward wedge ring has an angled surface in the range of from 20 degrees to 85 degrees relative to an axis perpendicular to the longitudinal axis of the annular recess.

3. The seal assembly of claim 1, wherein the forward wedge ring has an angled surface in the range of from 20 degrees to 85 degrees relative to an axis perpendicular to the longitudinal axis of the annular recess.

4. The seal assembly of claim 1, wherein the rearward wedge ring has an angled surface in the range of from 20 degrees to 85 degrees relative to an axis perpendicular to the longitudinal axis of a plunger, if the rearward wedge ring is disposed within an annular recess of a cylindrical chamber for receiving a plunger.

5. The seal assembly of claim 1, wherein the forward wedge ring has an angled surface in the range of from 20 degrees to 85 degrees relative to an axis perpendicular to the longitudinal axis of a plunger, if the rearward wedge ring is disposed within an annular recess of a cylindrical chamber for receiving a plunger.

6. The seal assembly of claim 1, wherein the at least one extrusion recess is at an intersection of the rearward and forward wedge rings.

7. The seal assembly of claim 1, wherein the extrusion recess extends a selected distance rearward from the forward edge of the cylindrical surface of at least one of the wedge rings, defining a forward facing step at a rearward end of the extrusion recess.

8. The seal assembly of claim 1, wherein the extrusion recess has an entrance substantially at an intersection of the angled surface with the cylindrical surface of at least one of the wedge rings.

9. The seal assembly of claim 1, wherein:
   the forward wedge ring has a forward facing convex surface adjacent to and in contact with a rearward facing concave surface of the main seal; and
   the extrusion recess is positioned at a rearward end of the convex surface portion.

10. The seal assembly of claim 1, wherein the at least one extrusion recess comprises two extrusion recesses, each located at a forward edge of one of the cylindrical surfaces.

11. The seal assembly of claim 1, wherein the extrusion recess has an entrance at an intersection of the mating angled surface with the cylindrical surface of at least one of the wedge rings.

12. A reciprocating pump assembly comprising:
   a pump housing defining a pump cavity in an interior of the housing and a cylinder chamber extending from an exterior of the pump housing to the pump cavity;
   a plunger disposed at least partially within the cylinder chamber and configured to reciprocate in an axial direction into and out of the pump cavity in rearward and forward directions between suction and discharge strokes, respectively;
   an annular recess formed in the cylinder chamber and positioned between an exterior of the pump housing and the pump cavity;
   a seal assembly having a main seal in abutment with a wedge-type seal disposed within the recess, the seal assembly configured to seal the plunger to the cylinder chamber;
   wherein the wedge-type seal comprises a rearward wedge ring and a forward wedge ring each of the wedge rings having a cylindrical surface;
   wherein the rearward wedge ring and the forward wedge ring have mating angled surfaces configured to slide against one another such that in response to the sliding movement, the rearward and forward wedge rings move in a radial direction perpendicular to the axial direction to increase their combined radial width relative to an axis of the cylinder chamber during a discharge stroke;
   at least one extrusion recess formed on at least one of the wedge rings; and
   wherein during the discharge stroke of the plunger a rearward portion of the main seal extrudes into the extrusion recess.

13. The pump assembly of claim 12, wherein the at least one extrusion recess is on a forward edge of the cylindrical surface.

14. The pump assembly of claim 12, wherein the rearward wedge ring has an angled surface in the range of from 20 degrees to 85 degrees relative to an axis perpendicular to the longitudinal axis of the annular recess.

15. The pump assembly of claim 12, wherein the forward wedge ring has an angled surface in the range of from 20 degrees to 85 degrees relative to an axis perpendicular to the longitudinal axis of the annular recess.

16. The pump assembly of claim 12, wherein the rearward wedge ring has an angled surface in the range of from about 20 degrees to about 85 degrees relative to an axis perpendicular to the longitudinal axis of the plunger.

17. The pump assembly of claim 12, wherein the forward wedge ring has an angled surface in the range of from about 20 degrees to about 85 degrees relative to an axis perpendicular to the longitudinal axis of the plunger.

18. The pump assembly of claim 12, wherein the at least one extrusion recess is at an intersection of the rearward and forward wedge rings.

19. The pump assembly of claim 13, wherein the extrusion recess extends a selected distance rearward from the forward edge of the cylindrical surface of at least one of the wedge rings, defining a forward facing step at a rearward end of the extrusion recess.

20. The pump assembly of claim 12, wherein during the discharge stroke, one of the cylindrical surfaces is in contact with the plunger and the other is in contact with the annular recess in the cylindrical chamber.

21. The pump assembly of claim 12, wherein the extrusion recess has an entrance at an intersection of the angled surface with the cylindrical surface of at least one of the wedge rings.

22. The pump assembly of claim 12, wherein:
an inner one of the cylindrical surfaces is in sliding engagement with the plunger; and the extrusion recess is located on the cylindrical surface of the inner one of the cylindrical surfaces.

23. The pump assembly of claim 12, wherein the at least one extrusion recess comprises two extrusion recesses, each located at a forward edge of one of the cylindrical surfaces.

24. The pump assembly of claim 12, wherein:
the forward wedge ring has a forward facing convex surface adjacent to and in contact with a rearward facing concave surface of the main seal; and
the extrusion recess is positioned at a rearward end of the convex surface portion.

25. The pump assembly of claim 12, wherein the extrusion recess has an entrance at an intersection of the angled surface with the cylindrical surface of at least one of the wedge rings.

26. The pump assembly of claim 12, wherein the main seal is formed of a material that is softer than the material of the wedge ring.

27. A method for sealing a plunger to a pump housing within a reciprocating pump assembly, the method comprising:
(a) providing a seal assembly having a main seal and a back-up seal, the back-up seal being of a material harder than a material of the main seal and being expansible in a radial direction for increasing a width between inner and outer diameter cylindrical surfaces in response to an axially directed rearward force, and at least one extrusion recess for receiving an extruded portion of the rearward side of the main seal during a forward stroke of the pump plunger;
(b) positioning the seal assembly within a recess of a cylinder chamber that extends between an exterior of the pump housing and a pump cavity;
(c) inserting a plunger into the cylinder chamber so that an exterior diameter of the plunger contacts the seal assembly;
(d) reciprocating the plunger into and out of the pump cavity through the cylinder chamber; and
(e) as the plunger moves forward relative to the seal assembly, expanding a radial width of the back-up seal and extruding a portion of the main seal into the extrusion recess of the back-up seal, wherein expanding a radial width of the back-up seal includes providing a forward wedge ring and a rearward wedge ring each having a mating angled surface sliding against one another such that the rearward and forward wedge rings slidingly move in the radial direction to expand the radial width of the back-up seal.

28. The method of claim 27, wherein step (a) further comprises the extrusion recess is on a forward side of the back-up seal at an intersection of the forward side with one of the cylindrical surfaces and extending the extrusion recess a selected distance rearward from the forward edge of the cylindrical surface of at least one of the wedge rings to define a forward facing step at a rearward end of the extrusion recess.

29. The method of claim 27, wherein step (e) comprises contacting the plunger with one of the cylindrical surfaces of the back-up seal and contacting the annular recess in the cylindrical chamber with the other cylindrical surface of the back-up seal.

30. The method of claim 27, wherein an inner one of the cylindrical surfaces is in sliding engagement with the plunger, and step (a) further comprises locating the extrusion recess on the cylindrical surface of the inner one of the cylindrical surfaces.

31. The method of claim 27, wherein the at least one extrusion recess comprises two extrusion recesses and step (a) comprises locating each extrusion recess at a forward edge of one of the cylindrical surfaces.

32. The method of claim 27, wherein the at least one extrusion recess is at an intersection of the rearward and forward wedge rings.

* * * * *